W. C. DURANT.
AUTOMOBILE SEAT.
APPLICATION FILED OCT. 4, 1913.
1,116,041.
Patented Nov. 3, 1914.
2 SHEETS—SHEET 1.
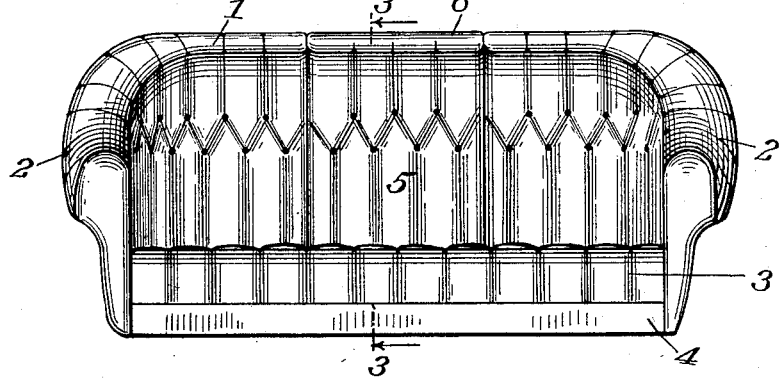
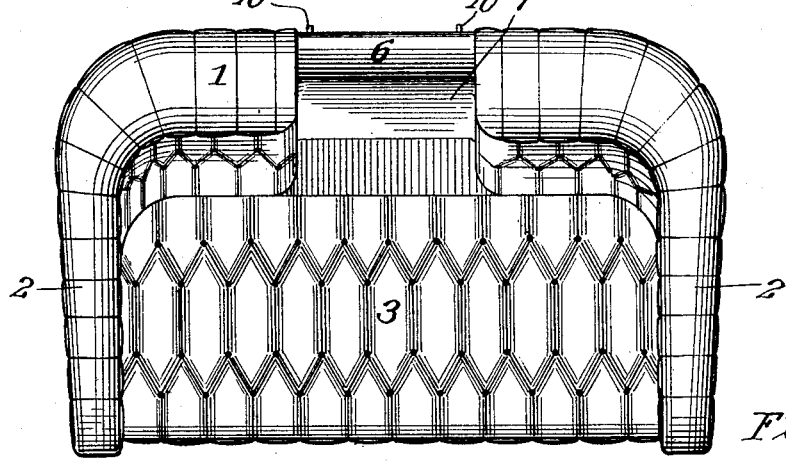
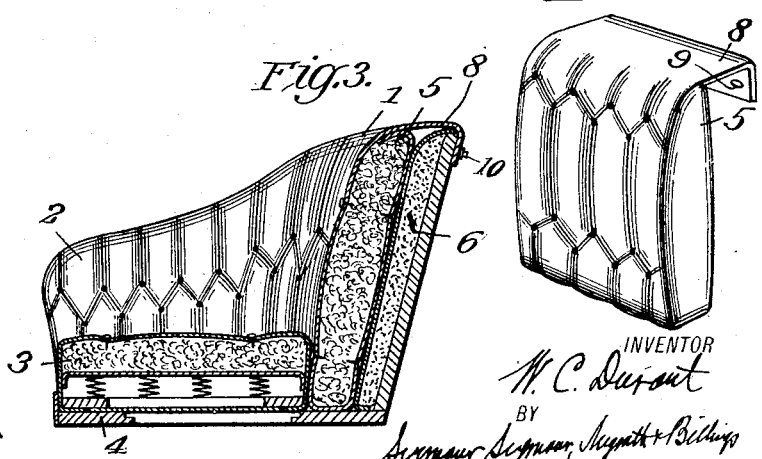

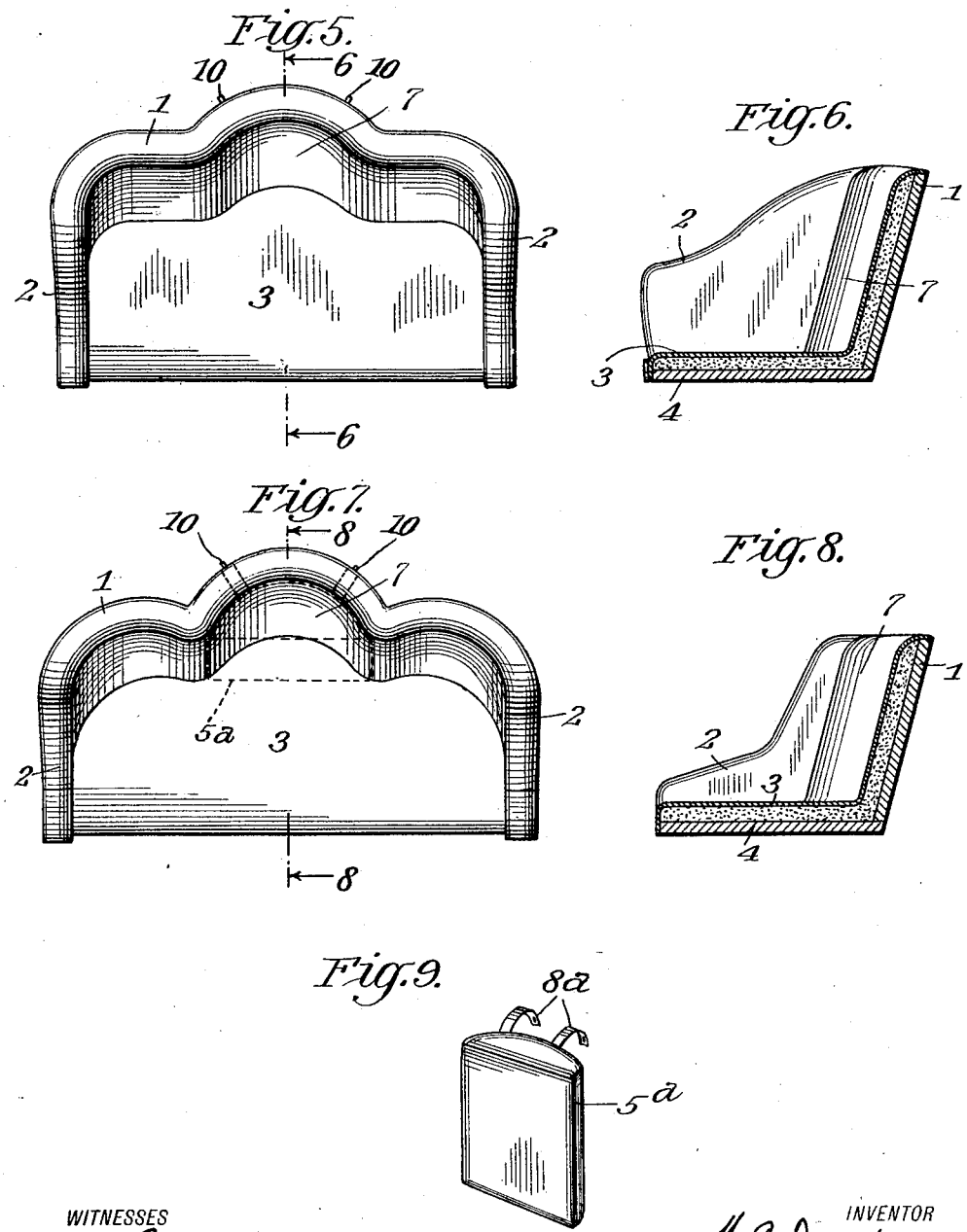

UNITED STATES PATENT OFFICE.

WILLIAM C. DURANT, OF NEW YORK, N. Y.

AUTOMOBILE-SEAT.

1,116,041.  Specification of Letters Patent.  Patented Nov. 3, 1914.

Application filed October 4, 1913. Serial No. 793,356.

*To all whom it may concern:*

Be it known that I, WILLIAM C. DURANT, a citizen of the United States of America, and a resident of the city, county, and State of New York, have invented a new and useful Improvement in Automobile-Seats; and I do hereby declare the following to be a full, clear, and exact description thereof.

One of the objects of my invention is to construct a self contained seat for an automobile of narrow width, so that it will accommodate several persons therein, with safety and comfort.

The other objects will appear from the hereinafter description.

It is well known that heretofore the seats in a roadster or runabout car were not of sufficient width to make it possible to accommodate therein three persons comfortably when riding merely as passengers, or permit the driver and two passengers to sit comfortably therein, and at the same time enable the driver to operate the machine comfortably, successfully and safely. So also in small touring cars of medium size, neither seat accommodated comfortably three people.

With the use of my invention, it is practicable to so construct the rear seat of an ordinary width car of medium size to hold three people comfortably, and when my invention is applied to the front seat which would otherwise carry but one passenger besides the driver, it will permit two passengers to be seated therein in addition to the driver of the car, and at the same time allow sufficient elbow room for the driver to operate the machine comfortably, successfully and safely, without crowding the passengers seated with him.

In addition to these great advantages to be derived from my invention in that three passengers may be comfortably seated on the rear seat or that two passengers and the chauffeur or driver can ride in comfort upon a front seat, while the driver is left free to operate the car without being crowded by the passenger next to him, thus insuring not only comfort of all concerned but their safety as well, another advantage of my invention is that the seats of an ordinary sized touring or other style of car can be made much narrower than heretofore, with consequent reduction in the weight and the cost of the car, due to the saving of material which would otherwise be used in the construction of the seats and the bodies thereof.

To these ends the invention consists in the arrangement of parts illustrated more particularly in the accompanying drawings, forming a part of the specification, in which:

Figure 1 is a front elevation of an automobile seat containing my invention. Fig. 2 is a plan view of an automobile seat showing my invention in another aspect thereof. Fig. 3 is a section of an automobile seat on the line 3—3 of Fig. 1. Fig. 4 is a perspective view of a removable section of the back cushion, which is shown in place in Fig. 1, removed in Fig. 2 and in section in Fig. 3. Fig. 5 is a plan of a modification of my invention. Fig. 6 is a section of Fig. 5 on the line 6—6. Fig. 7 is a plan of another form of my invention. Fig. 8 is a section on the line 8—8 of Fig. 7. Fig. 9 is a perspective view of a removable element to be applied to the middle sitting in the construction shown in Figs. 5 and 7, as shown in dotted lines in Fig. 7.

In the drawings the same reference numerals apply to similar elements in the separate views.

1 represents the back of an automobile seat, 2 the arms, 3 the removable spring cushion, 4 the support upon which the removable spring cushion rests, 5 a removable upholstered section of the upholstered back, 6 a fixed upholstered section to the rear of the space in which the removable section 5 is placed, and 7 represents the space in the back for the insertion of the removable section 5.

In the preferred form of my invention, illustrated in Figs. 1 to 4 inclusive, the seat is preferably upholstered, in the main in the way common to automobile seats. There is provided a sectional space 7 in the center of the back extending from the top of the back to the fixed support at the bottom, on which the seat cushion rests. This space is in width substantially one-third of the entire width of the back of the seat, measuring from inside the respective arms. In this space the upholstered cushion 5 is fitted. When in place, the back of the seat will have the appearance of an ordinary seat. This sectional piece of cushion upholstery 5 is provided at its top with a flap 8 of leather or similar material, preferably of the same material which is used for its covering, and which extends for a predetermined distance depending upon the thickness of the back of the seat to which the cushion is to be secured.

In the outer edge of the flap eyelets 9 are provided which fit over fastening means 10, which may be the usual type of curtain fasteners common to automobiles. This fastening means holds the flap in place, and consequently assists in holding the sectional cushion in the space 7 provided therefor. The cushion section, however, fits the space closely and the lower end extends down to the support for the seat cushion so that it is also retained in place by friction against the upholstered side of the space, and also because the end of the sectional cushion extends down the back and to the rear of the rear edge of the seat cushion. These curtain fasteners 10 may be so placed on the rear seat that when the cushion 5 is removed they may be used to secure the lower end of the back curtain flap thereto.

When the cushion 5 is removed the sittings in the seats are then in what may be termed an echelon arrangement. The person who is seated in the middle of the seat is thus enabled to move backward a distance equal to the depth of the back space, and thereby free the trunk of the body, the hips, the shoulders and the arms from interference with the free play and exercise of the body and arms of the driver or chauffeur, if in the front seat, and also make the riding comfortable for the two passengers. Likewise, the three passengers in the rear seat are made comfortable.

In Figs. 5 and 6 I have shown a modification of the invention, in which the automobile seat is shown as upholstered in the way usual for seats in drays or runabouts. The back of this seat is curved rearwardly from points situated about one-third from each end thereof, thus forming a sitting in the rear of the sittings on the sides of the seat.

Figs. 7 and 8 show a similar structure in which the back is again slightly modified to form spaces for the three separate sittings, one of which is in the rear of the others. This seat also is upholstered in a way common to the automobile industry for seats of this character in runabouts.

To fill out the space 7 in the construction shown in Figs. 5 to 8, I have provided the cushion 5ª, as shown in Fig. 9, the said cushion being shown in place in dotted lines in Fig. 7. In this construction I have used straps 8ª, instead of a single flap for securing the section 5ª in place.

Having now described my invention, what I claim as new and desire to secure by Letters Patent is:

1. An automobile seat, adapted for a plurality of sittings, provided with a unitary seat portion for all of the sittings having a continuous substantially unbroken front, in combination with a fixed substantially vertical back rest portion divided into sections for individual back rests, each adjacent individual back rest being offset one from the other and bounded by substantially parallel planes as and for the purpose set forth.

2. An automobile seat adapted for a plurality of sittings, having a horizontal portion common to all the sittings, vertical portions forming individual back rests for each of the sittings situated in vertical planes one of which extends beyond and is substantially parallel to the other, and a separate and independently movable cushion closely fitting in and substantially filling the recess formed by the first mentioned back portion extending rearwardly beyond the vertical plane of the other back portion.

3. A seat of the class described provided with a fixed back upholstered throughout, one portion of the fixed upholstered back being of less thickness than that of the portion adjacent thereto and also of less width than the entire width of the fixed upholstered back, each of the above described back portions forming a back rest for an individual sitting and a removable upholstered section fitting closely within and substantially filling the cavity thus formed.

4. An upholstered seat of the class described provided with a removable upholstered section in its back and a fixed upholstered back rest section adjacent the removable section, the fixed back section forming a separate and complete back rest cushion for an individual sitting, the removable section covering a separate and complete back rest cushion for an individual sitting and when in place the front surface of the removable section and the front surfaces of the fixed upholstered back rest sections first above mentioned, being each in substantially the same vertical plane.

5. An automobile seat adapted for a plurality of sittings having a horizontal portion common to all the sittings, vertical portions forming individual back rests for each of the sittings situated in vertical planes extending beyond and substantially parallel to each other, the adjoining portions forming back rests for adjacent sittings, and a removable cushion closely fitting in and substantially filling the recess formed by the first mentioned back portion extending beyond the vertical plane of the other back portion to bring all the back rests in substantially the same vertical plane.

6. An automobile seat adapted for a plurality of sittings having a horizontal portion common to all the sittings, an arm rest at each end of the seat portion and a back rest at the rear thereof extending between the arms, a portion of the back rest opposite an individual sitting situated at the rear of an adjoining portion of the back rest likewise opposite an adjoining individual sitting, thereby forming a recess or pocket to receive and position the body of an occupant of one of the sittings beyond and out of the way of the body of an occupant of an adjoining sitting and a removable cushion closely fitting in and substantially filling said recess or pocket.

In witness whereof I have hereunto set my hand at the city, county and State of New York, this third day of October, 1913.

WILLIAM C. DURANT.

In presence of—
S. E. MILLER,
JOHN J. RANAGAN.

Copies of this patent may be obtained for five cents each, by addressing the "Commissioner of Patents, Washington, D. C."